Figure 1:
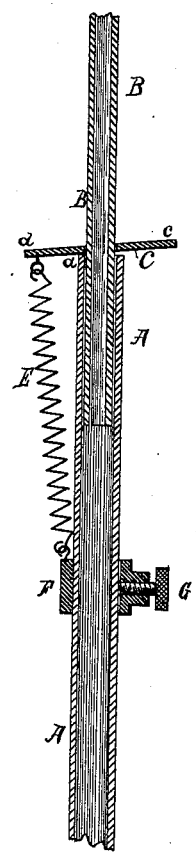

(No Model.)

C. S. WARDWELL.
BELT TIGHTENING DEVICE.

No. 326,695. Patented Sept. 22, 1885.

WITNESSES:
Joseph L. Levy
John H. Ives

INVENTOR
Claison S. Wardwell
BY Phillips Abbott
his ATTORNEY

UNITED STATES PATENT OFFICE.

CLAISON S. WARDWELL, OF STAMFORD, CONNECTICUT.

BELT-TIGHTENING DEVICE.

SPECIFICATION forming part of Letters Patent No. 326,695, dated September 22, 1885.

Application filed August 1, 1885. (No model.)

*To all whom it may concern:*

Be it known that I, CLAISON S. WARDWELL, a citizen of the United States, and a resident of Stamford, in the county of Fairfield and State of Connecticut, have invented certain new and useful Improvements in Belt-Tightening Devices, of which the following is a specification.

My invention relates to a new and useful combination of devices whereby the belt which gives motion to parts of certain classes of mechanical devices may be quickly and effectively tightened and loosened at will; and it consists in forming the arm or support upon which one of the wheels or pulleys is placed, over which the belt passes, in two parts longitudinally movable relative to each other, which parts in tightening the belt slide past one another, and also in placing an automatic adjustable clutch in such position relative to the longitudinally-movable parts of the arm that it will be supported upon one of the parts, and will automatically grip the other part and hold it in its extended or retracted position, as desired.

In order that my invention may be more fully understood, I will describe my invention and illustrate it in the drawings as applied to the arm or standard which supports the pulley-head in an ordinary dental engine—such, for instance, as the well-known "White" or "Johnston" dental engines; but I do not limit myself to the use of my invention on dental engines alone, for it is equally applicable to glass-cutters' and engravers' engines and to many other such devices.

In the drawings the same letters indicate the same parts in both figures.

Figure 2:

Figure 1 illustrates a longitudinal plan view of the invention. Fig. 2 illustrates a detached view of the clutch.

A is the lower rod-section of the arm, shown in the drawings as tubular and as made of metal; but it may be made in any other desired form and of any other suitable material.

B is the upper rod-section, shown as cylindrical and of metal; but this part also may be made in any other suitable form and of any other suitable material. I prefer the forms shown, because the parts operate more efficiently when so constructed. The upper section, B, fits loosely within the part A, and may be telescoped therein.

C is a small plate of metal, preferably hardened steel, which has an extension, c, on one side, and a somewhat similar extension, d, on the opposite side, of a hole, D, formed in it, which is in size somewhat larger than the external diameter or size of the upper section, B, so that it (the part B) will drop readily and without friction through the hole D when it and C are at right angles or substantially at right angles to each other.

E is a spring, preferably a spiral spring, as shown, which is fastened at one end to the end d of the plate C, and at the other end to a sleeve, F, which encircles the section A and slides upon it, being fastened at the desired point by the set-screw G.

It will be understood that the driving or balance wheel of the engine is located at or near the lower end of the section A on the base of the engine, and that the pulley-head, with its pulley, &c., is attached to the upper end of the section B, all as usual in such apparatus, and that the usual cord or belt for transmitting motion extends from one to the other.

The operation is as follows: The parts being in the position shown in Fig. 1, and the arm-section B being clamped and held by the plate C, owing to the oblique position of that plate relative to the part B, given to it by reason of the pull of the spring E, which causes the sharp edges of the hole D to impinge upon and clutch the sides of the rod B, the belt is tightened or loosened, as the case may be, by simply pressing with the finger or thumb on the end c of the plate C, thus tilting the plate C against the stress of the spring E, the upper end of the section A (seen at a) acting as the fulcrum for the plate C. When the plate C has been tilted sufficiently far, the section B will become released from the clamping action of the sides of the hole D in the plate C, resulting from the oblique position of the plate relative to it, as before stated, and the part B may then be pulled out or shoved in, as desired, thus tightening or loosening the belt, and the moment that pressure upon the end c of the plate is released the spring E will instantly tilt the plate C and clamp the rod B in its then position.

The gripping power of the plate C on the rod B may be adjusted by sliding the sleeve F downwardly or upwardly on the rod A, thus increasing or diminishing the tension of the spring E.

It is obvious that the fulcrum of the plate C may be any suitable support attached to or formed on the rod A, which will support the outer end, $c$, of the plate C, instead of the support $a$; but although this method of supporting the plate C will increase its clamping power, I prefer the method shown, because the downward depression of the free end $c$ of the plate for releasing the rod B is more convenient than lifting the end $d$, which would be necessary if the fulcrum were placed at the end $c$, and the method shown I have found sufficiently strong in clamping action.

It is obvious that my invention may be used where an extension of an arm is desired, whether for the purpose of tightening a belt or for any other purpose.

Having described my invention, I claim—

1. The combination of a pulley-supporting arm formed of two parts longitudinally movable relative to each other, and a clamping-plate, through a hole in which one of the parts of the arm passes, and which is clamped by impingement of the sides of the hole against the sides of the part of the arm which passes through the hole, when the plate and the arm are oblique to each other, and a fulcrum for the arm formed on or attached to the other part of the arm, substantially as and for the purposes set forth.

2. The combination of a pulley-supporting arm formed of two parts, A and B, longitudinally movable relative to each other, a clamping-plate, C, fulcrumed on the part A of the pulley-supporting arm, and a spring, E, which aids the clamping action of the plate C, substantially as and for the purposes set forth.

3. The combination of a pulley-supporting arm formed of two parts, A and B, longitudinally movable relative to each other, a clamping-plate, C, fulcrumed on the part A of the pulley-supporting arm, a spring, E, and set-sleeve F, whereby the tension of the spring E, and consequent clamping power of the plate C, may be increased or diminished at will, substantially as and for the purposes set forth.

4. The combination of an extendible pulley-supporting arm formed of two parts longitudinally movable relative to each other, a clamping-plate, C, provided with pressure extension-piece $c$ and spring-attaching piece $d$, said plate C being fulcrumed on the part A of the pulley-supporting arm, and a spring, E, whereby the clamping power of the plate C will be aided, substantially as and for the purposes set forth.

5. The combination of an extendible pulley-supporting arm formed of two parts longitudinally movable relative to each other, a clamping-plate, C, provided with pressure extension-piece $c$ and spring-attaching piece $d$, said plate C being fulcrumed on the part A of the pulley-supporting-arm, a spring, E, and set-sleeve F, adjustable on the part A, whereby the tension of the spring E, and consequent clamping power of the plate C, may be adjusted as desired, substantially as and for the purposes set forth.

Signed at New York city, in the county of New York and State of New York, this 31st day of July, A. D. 1885.

CLAISON S. WARDWELL.

Witnesses:
JOHN H. IVES,
CHARLES B. WEBERG.